J. BÖCKER.
BEET HARVESTER.
APPLICATION FILED JULY 31, 1912.

1,069,380.

Patented Aug. 5, 1913.
5 SHEETS—SHEET 1.

FIG. 1.
E-F

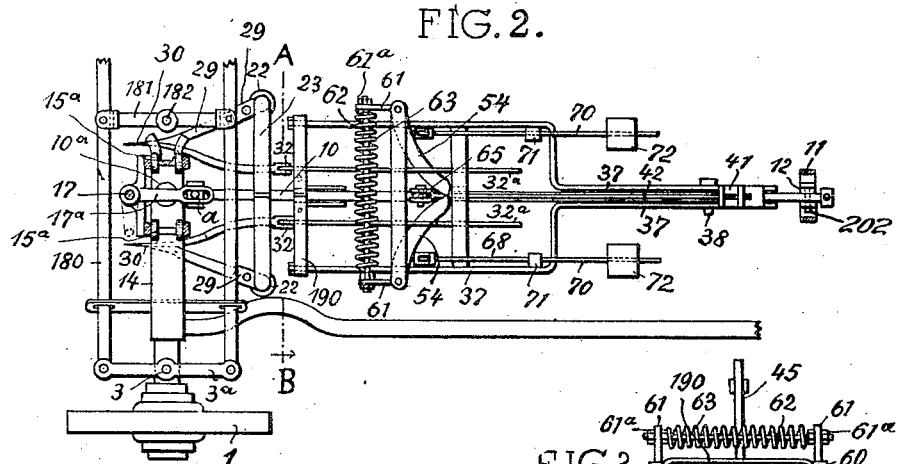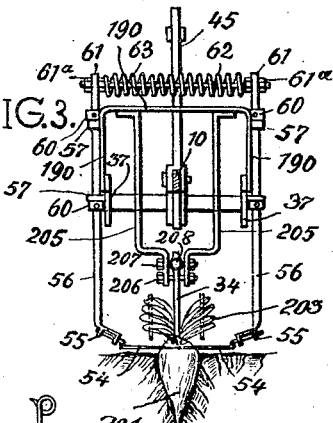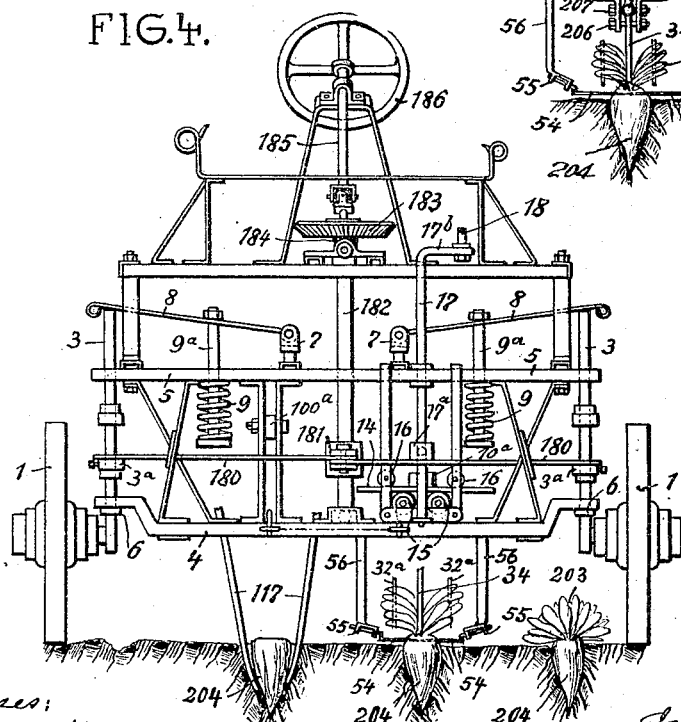

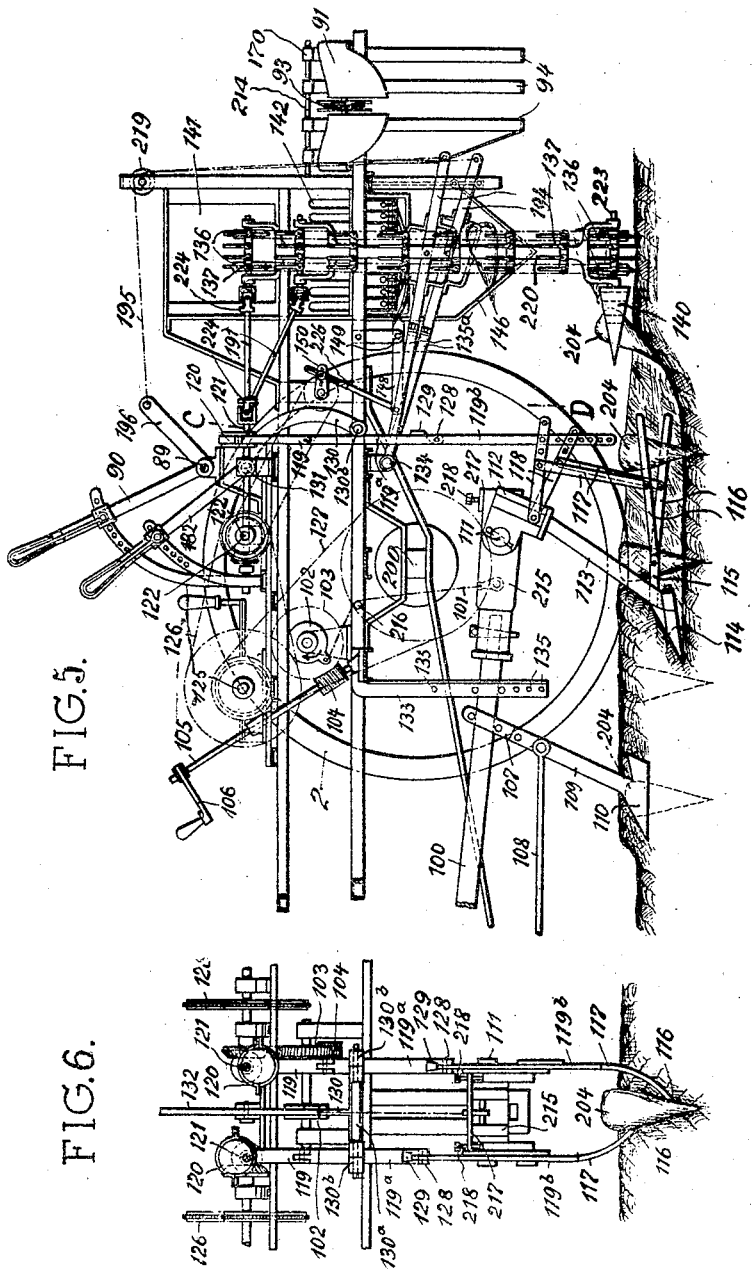

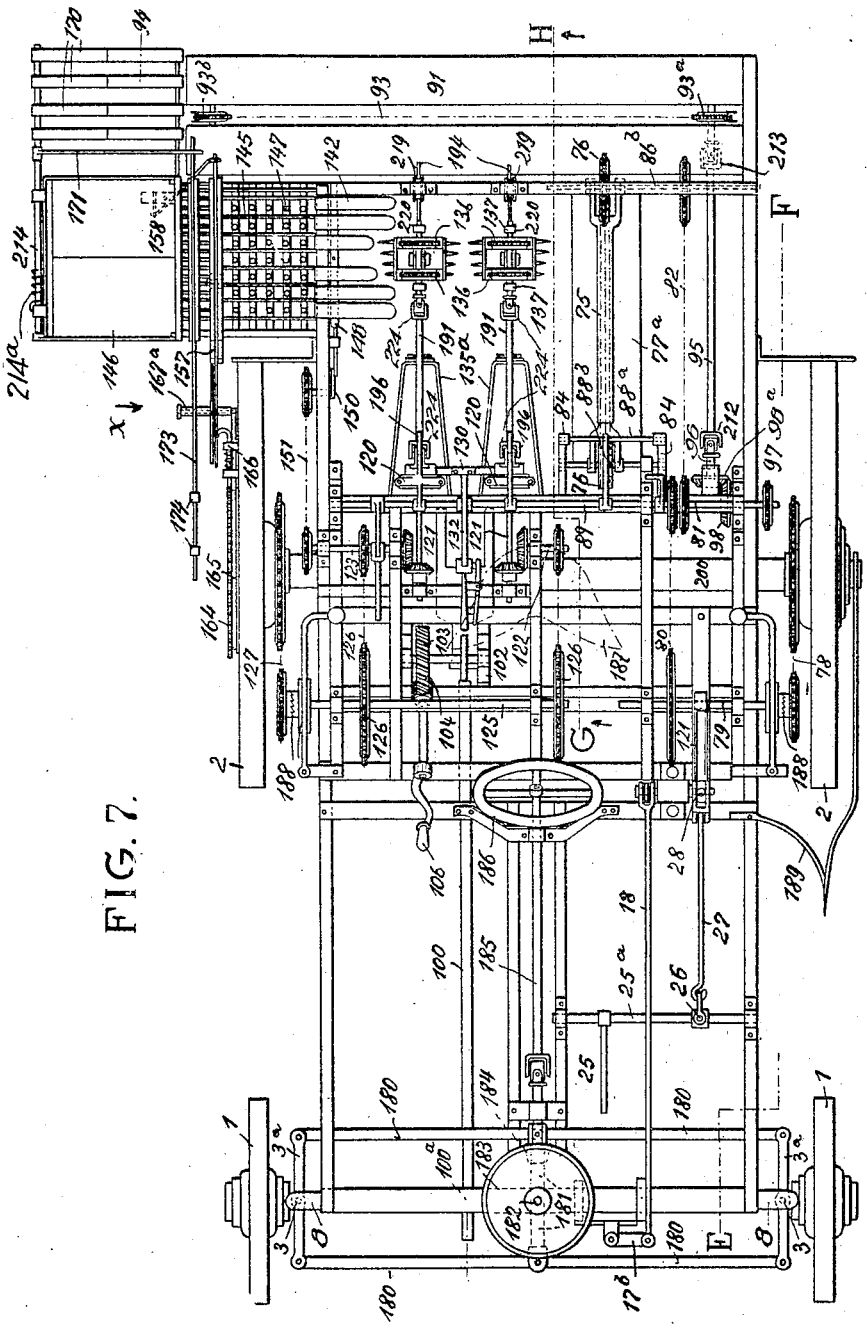

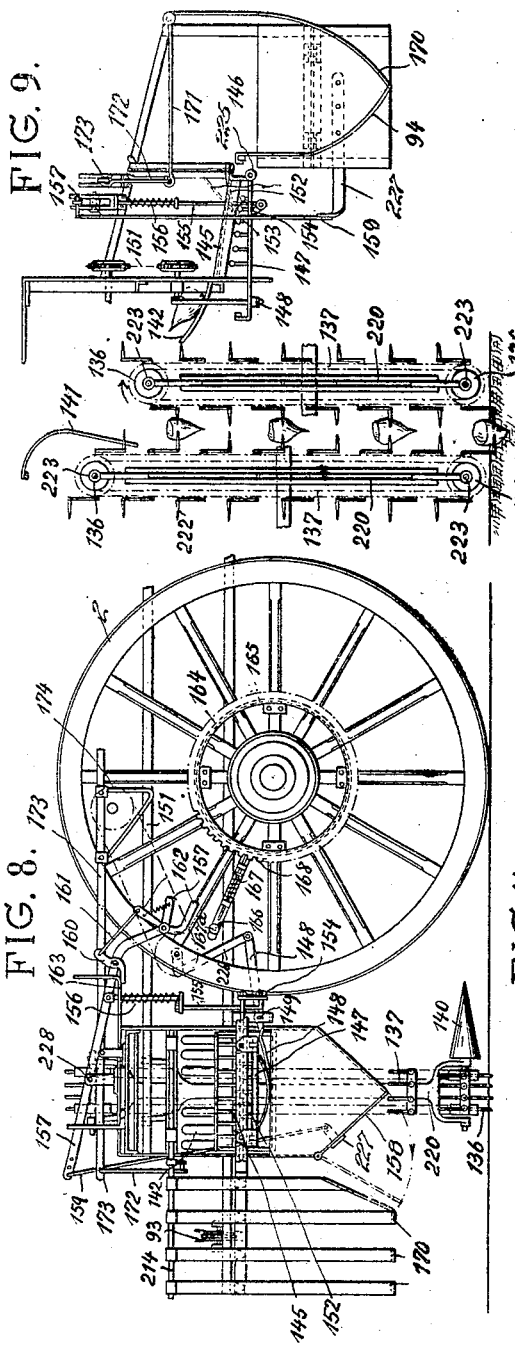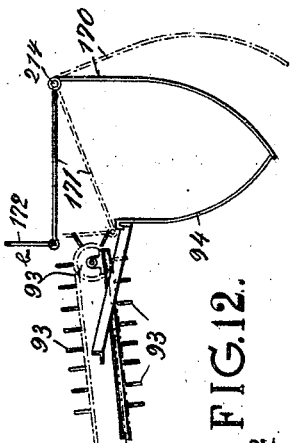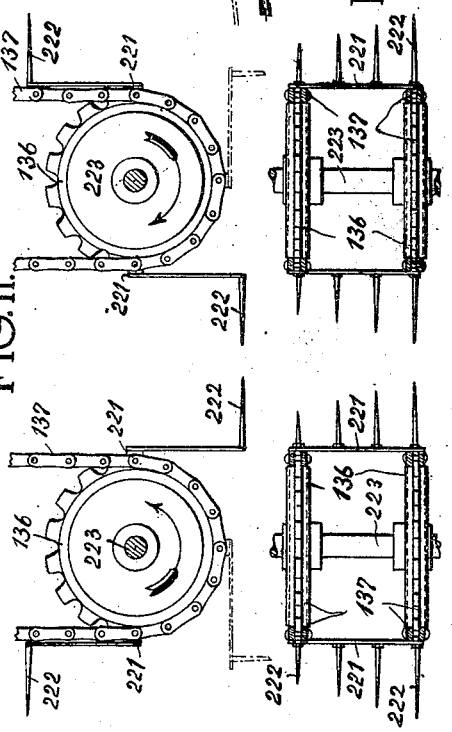

UNITED STATES PATENT OFFICE.

JACOB BÖCKER, OF CASTER, NEAR BEDBURG, GERMANY, ASSIGNOR OF ONE-HALF TO THEODOR WASSENBERG, OF ELSEN, NEAR GREVENBROICH, GERMANY.

BEET-HARVESTER.

1,069,380. Specification of Letters Patent. Patented Aug. 5, 1913.

Application filed July 31, 1912. Serial No. 712,456.

*To all whom it may concern:*

Be it known that I, JACOB BÖCKER, a citizen of the Empire of Germany, residing at Caster, near Bedburg, Rhenish Prussia, in the Empire of Germany, have invented a new and useful Beet-Harvester, of which the following is a specification.

My invention relates to a beet-harvester adapted to simultaneously cut off the tops of beets or other bulbous vegetables in one row and to lift the cut beets in another row out of the soil, also to separately collect the tops and the beets and to discharge them from time to time. The tops cut off are thus protected from damage and kept separate from the beets. The heaps of tops and of beets separately discharged from the machine are deposited on the ground in rows at right angles to the rows of the unlifted beets. The top cutting device can be displaced with regard to the beet lifting device, so that the driver is enabled to adjust his machine to the varying distance between the rows of the unlifted beets and to shift the top cutting device at any time into the correct position for properly cutting the several tops. The top cutting device is provided with grippers for engaging beneath the lowest leaves and for raising them and also with means for vertically adjusting the knives, so that they can cut the several tops at the proper height and consequently all waste of bulbs is avoided. Behind the top cutting device an elevator is disposed in the frame of the harvester. The beet lifting device comprises a pair of shares for loosening and heaping the soil up on both sides of the beet row, and a pair of vibrating bars pivotally connected with the shares and adapted to alternately and successively push the bulbs from opposite sides in alternating directions for gradually lifting them out of the soil. Behind the beet lifting device a pair of vertical elevators is disposed in the frame of the harvester and two horizontal forwardly tapering cones are fastened on the two shafts of the lower chain wheels of the two elevators, so that during their rotation in opposite directions they are adapted to conduct any lifted beet that may be out of line into the middle vertical longitudinal plane. The parts of the two elevators facing one another are moved upward and are provided with horizontal rows of pins in the same planes for the two elevators, which pins are adapted to prick and to raise the bulbs. The length of the pins in each row increases from the front to the rear of the machine, so that all beets of different size can be certainly seized.

Other improvements will be hereinafter described and pointed out in the claims.

I will now proceed to describe my invention with reference to the accompanying drawings, in which—

Figure 1 is a vertical longitudinal section through the beet-harvester on the broken line E—F in Fig. 7 and shows only the top cutting and lifting device, Fig. 2 is an upper view of the top cutting device, Fig. 3 is a vertical section through the line A—B in Fig. 2, Fig. 4 is the front end view of the machine and shows only the front parts, while all the other parts are omitted, Fig. 5 is a vertical section through the broken line G—H in Fig. 7 and shows the beet lifting device, Fig. 6 is a vertical cross section through the line C—D in Fig. 5, Fig. 7 is an upper view of the beet-harvester and shows only the upper parts, Fig. 8 is an elevation of the rear part of the same, seen in the direction of the arrow $x$ in Fig. 7, Fig. 9 is a rear end view and shows the two elevators and the receptacle of the beet lifting device, also the receptacle of the top lifting device, Fig. 10 is a similar view and shows the conveyer and the receptacle of the top lifting device, Fig. 11 shows the lower end of the two bulb elevators, and Fig. 12 is an upper view of the same.

Similar characters of reference refer to similar parts throughout the several views.

The beet-harvester comprises a frame, the construction of which is for example shown, but not further described here, as it may be varied to suit the circumstances. In this frame is fastened a rear axle 200 (Figs. 1 and 7), on the ends of which two large rear wheels 2, 2 are mounted to turn independently of one another. At the front the frame comprises a lower crooked bar 4 and a straight bar 5 above this bar (Figs. 1 and 4). The ends of these two bars 4 and 5 have holes, in which two vertical shafts 3, 3 are mounted to turn and to longitudinally move. The two shafts 3, 3 are each made in one with a horizontal pin at the lower end and on these two pins two small front wheels 1, 1 are mounted to turn. Preferably the two shafts 3, 3 are provided with collars 6, 6, on which the ends of the lowest bar 4 are made to bear. On the bar 5 are provided two studs 7, 7, which are pivotally connected with two levers or leaf springs 8, 8. The outer ends of these levers are made to bear from above against the two shafts 3, 3 and two helical springs 9, 9 are provided beneath the bar 5 for pressing the two levers 8, 8 downward by means of rods $9^a$, $9^a$. It will be seen, that in this manner all the four wheels 1, 1, 2, 2 are brought into close contact with the soil, so that when either front wheel 1 moves into some hole or recess in the ground, the frame and consequently the whole machine is protected from tilting, since the frame is still supported in its normal position by the three other wheels. On the other hand, when either front wheel 1 runs over some elevation, the frame will move with it upward, while the other front wheel 1 remains in contact with the soil and prevents the vehicle from tilting. On each shaft 3 is fastened a two-armed lever $3^a$ and the outer ends of the two levers $3^a$, $3^a$ are pivotally connected by means of rods 180, 180 with the outer ends of a third two-armed lever 181 fastened on a vertical shaft 182, which latter is mounted in the frame to turn. At the upper end the shaft 182 carries a bevel wheel 183, which meshes with an inclined bevel pinion 184 (Fig. 1). The shaft of this pinion is connected by means of a universal joint 201 with an inclined shaft 185 carrying a hand-wheel 186. It will now be seen, that the driver on the seat 187 (in Fig. 7 indicated by dotted lines) is in this manner enabled to steer the vehicle. Any animal is in any known manner (not shown) to be put to the vehicle, for example by means of some draft-bar attached to the lowest bar 4 on the left end in Fig. 4, so that the animal can go along a row of beets about to be lifted out without damaging the bulbs.

The vehicle frame comprises a small vertical frame 11 (Figs. 1 and 2), within which a smaller frame 12 is mounted to swing on pins 13, 13 around a vertical axis. The frame 12 is provided with a cross pin 202, on which a crooked bar 10 can rock. The front thickened end $10^a$ (Fig. 2) of this bar 10 has a hole, in which a vertical pin on a horizontal plate 14 (Fig. 4) engages, so that in this manner the bar 10 is pivotally connected with the plate 14. The plate 14 is longitudinally guided in the frame in the cross direction of the vehicle and by means of two rolls 15, 15 below and four rolls 16, 16 above (Figs. 1 and 2). The thickened end $10^a$ of the bar 10 is permitted to move between the four rolls 16, 16. Near the end $10^a$ the bar 10 carries an upwardly projecting pin $a$, which engages in the slot of a slotted arm $17^a$ fastened on a vertical shaft 17 that rocks in the frame and has an upper arm $17^b$ (Figs. 4 and 7). This arm $17^b$ is pivotally connected by means of a rod 18 with a hand-lever 19 loose on a shaft 20 secured in the frame. The bar 10 is by means of a suitable crosshead rigidly connected with two superposed cross bars 22, 22 (Fig. 1), in which two vertical bars 23 are guided and can be adjusted by means of two pins $23^a$ introduced above and beneath the upper bar 22 into any of several holes provided in the bars 23. The upper parts of the two bars 23, 23 are inclined, so that their upper ends are in contact with one another and can be together pivotally connected by means of a rod 24 with an arm 25 (Figs. 1 and 7) fastened on a shaft $25^a$ rocking in the frame. Another arm 26 fastened on the shaft $25^a$ is pivotally connected by means of a rod 27 with another hand-lever 28, which is loose on the shaft 20 and can be adjusted in any position by means of two guiding bows 21 provided with a series of recesses into any of which the point at the lower end of a known spring-pressed lever $28^a$ can engage. Or the bow 21 may be provided with known notches, into any of which a known spring-pressed lock guided on the hand-lever 28 can engage. The lower ends of the two bars 23, 23 form shoes, in which two grippers 30, 30 are in any known manner adjusted, so that they can be moved nearer together or apart. These grippers 30, 30 are adapted to engage beneath the lowest leaves of the tops 203. It is to be noted, that normally the shaft 17, the lever 25 and the bar 10 are to be in the vertical plane of a row of beets 204. The two grippers 30 are to be pivotally connected at 32 (Fig. 1) with two inclined rods $32^a$, which are to be supported in any known manner (not shown) by the frame and serve for raising during the drive the leaves engaged by the grippers 30.

Two bent levers 37, 37 (Figs. 1 and 2) are mounted on both sides of the bar 10 to rock on a pin 38, which pin can be introduced into any of the holes 39 provided in the levers and through the respective hole of the bar. Where so preferred, of course the holes 29 may be provided in the bar 10 instead of in the levers 37. The front ends of the two levers 37, 37 are connected together by means of a bow 190 (Fig. 3), so that the parts 37, 190, 37 form a frame rocking on the pin 38. The bow 190 is provided in its middle with a lug $190^a$, which is yieldingly connected with the above mentioned arm 25 by means of a chain 73 or the like. The bow 190 is rigidly connected with two arms 205, 205, the lower ends of which are connected together by means of two superposed pins 206 and 207. On the lower pin 206 a curved lever 34 (Fig. 1) can rock, which is provided with a front arm 31 and an upper slotted arm 208. The upper pin 207 passes through the slot of the arm 208, which latter is provided with two opposite adjusting screws 209, 209 adapted to bear against the pin 207. It will be understood, that the lever 34 can be lowered by screwing the right adjusting screw 209 rearward to the right in Fig. 1 and screwing the left screw 209 forward in the same direction, or raised by screwing the two screws in the opposite direction. The front arm 31 serves as a divider, which passes through the middle of any top 203, and the lever 34 is to engage in the space formed by the front arm 31 and serves for preventing the top 203 from shifting to either side during the cutting operation. When the rows of beets 204 happen to be not at the correct distance from one another or when any beet happens to be out of line, the driver perceiving this can so turn his hand-lever 19, as to move the bent lever 34 into the vertical central plane of the row of beets, so that the correct cutting of the top 203 is in this manner insured.

A bow 59 similar to bow 190 is pivotally connected with the two levers 37, 37 and is provided on each side with two superposed lugs 57, 57, in which two vertical shafts 56, 56 (Fig. 3) are mounted to turn and to longitudinally move. They are adjusted by means of loose collars 60, 60 with set-screws. The lower ends of the two shafts 56, 56 form shoes 55, 55, in which two oppositely bent knives 54, 54 (Fig. 2) can be secured. At the upper ends the two shafts 56, 56 carry two arms 61, 61, through the outer ends of which passes a rod 62 carrying at the ends two nuts 61ª, 61ª. A helical spring 63 surrounding the rod 62 bears against the two arms 61, 61. The two nuts 61ª, 61ª are so adjusted as to normally move the outer ends of the knives 54, 54 near together, so that they can cut the top of any beet 204 properly for detaching the top 203, which then drops on the soil. The helical spring 63 permits the two knives 54, 54 to open under the pressure of any obstacle (for example a stone) that may get between them. The bar 10 is pivotally connected with a link 45 (Figs. 1 and 3), which at its upper end is provided with several holes. Beyond the pin 38 the two levers 37, 37 are bent upward to form two rear arms, which are connected with a link 41 having two lugs. A rod 42 engages with its lower screw-threaded end in the two lugs of the link 41 and can be at its upper end pivotally connected with the upper end of the link 45 by means of a pin engaging in any of its holes 46. The bow 59 is in its middle rigidly connected with a bow 64, which compasses the link 45 and carries a roller 65 for reducing the friction between the two parts 45 and 64. Each side of the bow 59 has a lug 66, which by means of a link 67 is connected with the front arm of a two-armed lever 68. The bar 10 is pivotally connected with a frame 69 having on each side two pins 69ª and 69ᵇ. The said levers 68 are made to rock on the upper pins 69ª, while on the lower pins 69ᵇ two parallel levers 70 loaded with weights 72 are made to rock. Each lever 70 is pivotally connected with a bow 71 provided with several holes, and the bow 71 can be pivotally connected with the rear arm of the corresponding lever 68 by means of a pin introduced into any of its holes. The movable parts connected with the bar 10 and the weights 72, 72 are so adjusted or balanced, that the lever 34 and the knives 54, 54 normally occupy their lowest position, but that a slight pressure is sufficient for raising the knives. By means of this arrangement the knives 54, 54 will be lifted through a corresponding distance, in case the lever 34 is raised by a beet more projecting from the ground than the others. In such a case the roller 65 will run upward on the link 45, so that the knives 54, 54 will during their work move in a horizontal plane, in which then the top of the bulb 204 will be cut.

As is indicated in Fig. 1, the chain 73 for connecting the lug 190ª of the bow 190 with the lever 25 remains slack during the normal work of the machine. When for turning the vehicle during the work or for driving the harvester over some road the hand-lever 28 is pulled in the direction of the arrow 210 in Fig. 1, first the grippers 30 are raised by means of the rod 24 and afterward the lever 34 and the knives 54, 54 are raised by means of the chain 73, so as to keep these parts clear of the soil.

For lifting the cut tops 203 from the soil an elevator of the following construction is employed: Two levers 84, 84 (Figs. 1 and 7) rocking on the machine frame at 87 are by means of two chains 88 and a cross bar 88ª connected with an arm 88ᵇ fastened above on a shaft 89 rocking in the machine frame and carrying a hand-lever 90. The two levers 84, 84 are by means of two links 83 and a shaft 86ª pivotally connected with an extensible bar 86, which is suspended from a shaft 86ᵇ and is in any known manner so constructed, that it can extend on the levers 84 being lowered by means of the hand-lever 90 and contract on the levers 84 being raised. The two shafts 86ª and 86ᵇ carry two chain wheels 76, 76, over which an endless chain 75 of any known construction passes. The links of this chain carry pins 77, 77, which are adapted to prick and to carry along with them the tops 203 in the direction of the arrow 211 in Fig. 1 on an inclined bottom 77ª fastened in the machine frame. A scraper 92 is fastened above the upper chain wheel 76 on the machine frame and serves for stripping off any top that may still adhere to the pins 77 above the upper end of the bottom 77ª. A longitudinally slotted trough 91 (Figs. 1 and 7) fastened on the machine frame is to receive the tops 203 dropping from the elevator and a conveyer 93 (Fig. 10), that is an endless chain, disposed in the slot of the trough 91 serves for conveying the tops to a receptacle 94, 170 to be presently described. The conveyer 93 is shown as disposed slantingly and the shaft of the lower chain wheel 93ª is driven from the left rear wheel 2 (Fig. 7) by means of a chain gear 78, a shaft 79, a chain gear 80, a shaft 81, a chain gear 97, a shaft 97ª, two bevel wheels 98, 98ª, a shaft 96, a universal joint 212, a shaft 95 and another universal joint 213. The receptacle 94, 170 (Figs. 9 and 10) consists of a stationary bent grate 94 and a turnable bent grate 170 fastened on a shaft 214, which is mounted in the machine frame to rock (Fig. 8) and carries an arm 171, that is pivotally connected by means of a rod 172 with the rear arm of a two-armed lever 173 rocking on the machine frame. Any known means, for example a helical spring 214ª surrounding the shaft 214 and connected at one end with this shaft or a part of the movable grate 170 and at the other end with the machine frame, is employed for normally closing the receptacle by pressing the lower end of the movable grate 170 against the lower end of the stationary grate 94. The front arm of the lever 173 carries an adjustable triangle 174, which can be periodically struck from the right rear wheel 2 by means of a roller 167ª (Fig. 7) for turning the lever 173 and consequently turning the movable grate 170 into the position indicated by dotted lines in Fig. 10, whereby the receptacle 94, 170 is opened, so that the tops 203 therefrom discharged drop on the soil. The right rear wheel 2 is rigidly connected with a concentric ring 164, which is provided on the inner part with an annular groove and on the outer parts with notches similar to the tooth spaces of a gear wheel. A ring 165 (Fig. 7) turnable in the said groove of the ring 164 is made in one with an arm 166, which is slotted at the outer end and a pin adjustable in this slot carries the said roller 167ª. The arm 166 has two lugs, in which a spring-pressed handle 167 is guided and it will be understood, that normally under the pressure of its spring the handle 167 is made to engage in any of the notches of the ring 164, whereby the arm 166 is prevented from displacing itself with regard to the rear wheel 2. The handle 167 can be withdrawn from the notch against the pressure of its spring and then turned, so that in this manner the arm 166 with the roller 167ª can be adjusted in any position.

Where so preferred, the elevator described above may comprise two parallel endless chains 75 passing over two pairs of chain wheels 76, 76, so that corresponding links of the two chains can be connected together by means of cross bars carrying each several pins 77, 77, so that the tops 203 can be all seized and lifted with a greater certainty.

It will be understood, that the driver is enabled by pulling the hand-lever 90 forward to lift the lower end of the elevator 75, 76, 77 off from the ground during turning the machine or driving it over the road. He is also enabled to stop the motion of the endless chain or chains 75 by means of a left clutch 188 shown in Figs. 1 and 7, which requires no further explanation.

A divider 189 shown in Fig. 7 is preferably disposed in front of the left rear wheel 2 and near the ground for protecting the cut-off tops 203 from damage by the rear wheel.

A lever 100 (Fig. 5) is mounted in the machine frame to rock at 100ª (Fig. 4) in the vertical plane of the row of beets 204, the tops of which had been cut off by the device described above. The free end of the lever 100 is guided between two suitable parts 133, 133 of the machine frame and is shown as connected with a head 215, which is suspended from a disk 102 by means of a chain 101 or the like passing over a guiding pulley 216. On the shaft carrying the disk 102 is also fastened a worm wheel 103, which meshes with a worm 104 on an inclined shaft 105 that can be turned by means of a handcrank 106 from the driver's seat 187. In this manner the lever 100 can be lowered and raised, after which it may be secured by means of a pin introduced through any of the holes 135, 135 in the parts 133, 133. On the lever 100 is fastened in any known manner a bow 107 forming a part of a pair of parallel plow arms 109, which latter are pivotally connected with a rod 108 extending to the front of the machine frame (Fig. 5). The front end of the rod 108 may be connected with some known draft part, to which the animal can be put, if so preferred. The animal will also in this case have to go on the left side in Fig. 4, as explained above. The two plow arms 109 are shown as made in one with two plowshares 110 adapted to preliminarily plow the soil on both sides of the row of beets 204, so as not only to loosen the soil, but also to heap up the earth, as is shown in Fig. 5. The two shares 110 may be inclined inward and downward for producing the said effect. Any known means should be employed for varying at will the cross distance between the two plowshares 110, so as to leave a space between their edges slightly larger than the diameter of the beets. The heaping-up of the earth will facilitate the lifting of the beets as will be explained later. The head 215 has fastened in it a pin 111 and carries a bridge 217. On both sides of the head 215 two shoes 112 are mounted to rock on the pin 111 and two adjusting screws 218, 218 are disposed in the bridge 217 for adjusting the two shoes. Two arms 113 are secured to the shoes 112 in any known manner and are provided with plowshares 114 for further loosening and heaping up the soil. By means of the screws 218 and by turning the hand-crank 106 the depth, into which the shares 114 are to cut, can be adjusted.

Each plow arm 113 has at the lower end a rear arm 115, to which is pivotally connected a lifter 116. The lifter 116 is in turn pivotally connected by means of a bent rod 117 (Fig. 6) with a lever 118 on the upper end of the arm 113. Two parallel shafts 121, 121 (Figs. 6 and 7) are mounted in the machine frame to turn in opposite directions and carry two opposite eccentrics 120, 120, the two straps 119, 119 of which are pivotally connected with the two levers 118, 118 by means of rods 119$^a$ and 119$^b$. Each rod 119$^b$ has an upper arm 129 bearing against the lower end of the corresponding rod 119$^a$, whereby the two parts 119$^a$ and 119$^b$ are prevented from bending to the left in Fig. 5. A hand-lever 132 is mounted in the machine frame to rock at 131 and has a lower bent arm 130 with a cross head 130$^a$, which latter is adapted to bear with two rollers 130$^b$, 130$^b$ against the rod parts 119$^a$, 119$^a$ so that in this manner the three parts 119, 119$^a$, 119$^b$ are maintained in their normal straight position and are able to positively move the arm 118 and by the rod 117 also the lifter 116. When, however, by pulling the hand-lever 132 downward the two rollers 130$^b$, 130$^b$ are moved away from the rod parts 119$^a$, 119$^a$, then the parts 119$^a$, 119$^b$ of each rod can bend to the right in Fig. 5 for permitting the lever 100 with all parts connected therewith to be raised by turning the hand-crank 106 in the respective direction and thus the plowshares 110, 114 can be withdrawn from the soil and kept suspended during the drive or during turning. As the two eccentrics 120, 120 are placed oppositely, the two lifters 116, 116 will reciprocate in opposite directions, so as to alternately push the beet 204 from opposite sides for effectively loosening the beet and facilitating its ascent. The two lifters 116, 116 are rods of triangular cross section (Fig. 6), so as to enable them to better cut downward into the soil and to strike the beet 204 from below instead of sliding on it. Preferably the two lifters 116, 116 are made to converge rearward, so that also the smallest beets can be certainly seized and lifted. Each time, that the beet 204 is knocked upward the loosened soil will fill up the space left by the beet, so that the beet is prevented from sinking and is obliged to gradually rise from the soil, as is shown in Fig. 5.

The levers 118 are provided with several holes and also the lower ends of the rod parts 119$^b$, 119$^b$, so as to be able to adjust the several parts in their relative position.

The above mentioned two shafts 121, 121 are driven from the right rear wheel 2 by means of a chain gear 127, a shaft 125, two chain gears 126, 126, two shafts 122, 123 and two pairs of bevel wheels shown in Fig. 7. The motion of the shaft 125 and the parts thereby driven can be stopped by means of the right clutch 188 in Fig. 7.

Two bows 135$^a$, (Figs. 5 and 7) are mounted in the machine frame to rock at 134 and are rigidly connected with arms 194, 194, the free ends of which are suspended from two arms 196, 196 on the shaft 89 by means of two chains 195 or the like passing over guiding pulleys 219, 219. The two arms 194, 194 are pivotally connected with two vertical bars 220, which carry in their forked ends the shafts 223, 223 of chain wheels 136, 136 (Figs. 11 and 12). The chain wheels 136, 136 in the two bars 220, 220 are made to rotate in opposite directions, as is indicated by the arrows in Fig. 11. The two shafts 223, 223 of the lower chain wheels 136, 136 extend beyond the front bearings and carry two cones 140, 140, which taper forward and are therefore adapted to catch any beet 204 that may have moved out of the line and to conduct it to the vertical central plane between the two bars 220, 220. Over the four chain wheels 136, 136 in each bar 220 pass two endless chains 137, 137, certain corresponding links of which are connected together by means of cross pieces 221, 221. Each cross piece 221 carries several (here four) bent pins 222, 222, the parts of which parallel to the chain have the same length, while the other parts forming points at right angles to the chain have a length, which increases from the front to the rear of the machine so that the points of the two elevators facing one another can prick also the smallest beets and carry them upward with a certainty, see Fig. 9. During the motion of the endless chains 137, 137 the pins 222, 222 are made to engage in the soil, so that their points can strike the beet 204 nearly in a horizontal direction and thus prick it with a certainty. The inner bar 220 is longer than the outer one, as is shown at Fig. 9, so that the upper end of the inner bar 220 is higher than that of the outer bar. A scraper 141 is secured on the machine frame for stripping any beet still adhering to the points 222 of the left elevator and throwing it over the upper end of the right elevator. The two upper shafts 223, 223 are driven from the already mentioned two shafts 121, 121 by means of two shafts 191, 191 (Figs. 5 and 7) and four universal joints 224, 224, which latter permit the two elevators to be simultaneously raised and lowered by means of the hand-lever 90 without stopping the transmission of the motion. Of course, when the said right clutch 188 is withdrawn from the corresponding chain wheel, the motion of the endless chains of the two elevators will be at the same time stopped.

On the machine frame is fastened in any known manner (not shown) a stationary inclined grate consisting of a series of parallel bars 145 (Fig. 7) and carrying at the inner end a series of parallel upwardly bent bars 142 forming a chute for the beets 204 discharged from the two elevators. Beneath the grate 145 another grate is mounted in the machine frame to rock at 225 (Fig. 9) and this grate consists of a series of parallel bars at right angles to those of the upper grate and provided with upwardly projecting pins 147, which engage between the bars 145 of the upper grate (Fig. 7) and are adapted to strike and shake the beets for freeing them from most of the adhering earth. The free end of the rocking grate bears upon the bent rear arm of a two-armed lever 148 (Figs. 5 and 8) rocking in the machine frame at 149 and pivotally connected at its front end by means of a rod 226 with a crank 150 (Figs. 5 and 7), which is driven from the shaft 123 by means of a chain gear 151 (Fig. 7). The beets 204 sliding down the chute 142 and the upper grate 145 while being shaken by the pins 147 of the lower grate drop into a receptacle 146 fastened in any known manner (not shown) on the machine frame. The bottom of the receptacle 146 consists of two inclined plates, of which one 158 (Fig. 8) forms a trap-door, which is provided with a projecting arm 227 (Figs. 8 and 9). This arm 227 is pivotally connected by means of a rod 159 with the rear arm of a two-armed lever 157 rocking at 228. The front arm of this lever 157 is crooked, engages in the path of the roller 167$^a$ and carries two bent levers 160 and 162, the upper arms of which are connected together by means of a rod 161. The lower arm of the lever 162 also engages in the path of the roller 167$^a$, while the upper arm of the same is connected with the free end of the lever 157 by means of a helical spring shown in Fig. 8. The lower arm of the lever 160 normally engages beneath a stop 163, whereby the closed trap-door 158 is locked. In the upper grate 145 a shaft 153 (Fig. 9) is mounted to rock, which has fastened on it a bent arm 154 and a series of prongs 152 that are normally beneath the upper surface of the grate 145 and can turn upward into a position indicated by dotted lines in Fig. 9 for stopping the beets 204 on the grate 145. The arm 154 is pivotally connected with the front arm of the lever 157 (Fig. 8) by means of two rods 155 and 156 and a piece rigidly connecting the inner ends of these two rods. A helical spring surrounding the upper rod 156 and bearing on the one hand against the stop 163 and on the other hand against the said connecting piece serves for closing the trap-door 158 and turning the prongs 152 into their normal position.

It will be now understood, that during the drive of the machine the roller 167$^a$ on the arm 166 will strike first the lower arm of the lever 162 for unlocking the trap-door 158 and then the free end of the lever 157 for opening the trap-door 158 and turning the prongs 152 upward. Then the beets discharged from the receptacle 146 will drop on the soil and the beets discharged from the elevators will be stopped, so as to protect them from damage during the closing of the trap-door 158. When the roller 167$^a$ releases both levers 162 and 157, the helical spring surrounding the rod 156 will again close the trap-door 158 and turn the prongs 152 downward, while the lever 162 under the action of its spring will lock the trap-door. By turning and adjusting the arm 166 with the ring 165 the roller 167$^a$ can be made to strike the levers 162 and 157 at such a moment, that the beets are discharged from the receptacle 146 and from a heap on the ground at any desired distance from the end of the field. As the roller 167$^a$ actuates in the described manner the trap-door 158 once on every revolution of the right rear wheel 2, it will be evident, that the heaps of beets will be deposited on the soil at a distance from one another equal to the periphery of the rear wheel 2, which may be for example 3.750 meters. This distance is so great, that a car can be moved in the transverse direction between the heaps of beets and tops and be loaded with these materials respectively for removing them. By longitudinally adjusting the triangle 174 on the lever 173 the roller 167$^a$ can be made to strike the triangle for effecting the discharge of the tops from the receptacle 94, 170 at any desired moment, so that the distance between the heaps of beets and tops deposited can be varied at will. As the receptacle 94, 170 for the tops is disposed behind that 146 for the beets, it is even possible to effect the discharge of the tops at the moment, that the receptacle 94, 170 is above the heap of beets, so that the tops discharged will cover the heap of beets, if this is so desired.

It is to be noted, that the left rear wheel 2 is made to operate the top cutting and lifting device, while the right rear wheel 2 is made to operate the beet lifting device, so that it is possible to operate these two devices simultaneously or separately, as may be desired, as it is only necessary to engage or disengage the two clutches 188, 188 respectively.

The pin carrying the roller 167$^a$ can be so shifted on the arm 166 as to withdraw the roller from the reach of the levers 162 and 157 and of the triangle 174, when it is desired to drive the machine over the road.

The beet-harvester described can be varied in many respects without departing from the spirit of my invention.

I claim:

1. In a beet-harvester, the combination with a frame, of wheels for supporting said frame and adapted to roll on the soil, a top cutting and lifting device disposed longitudinally in said frame, a beet lifting device in said frame parallel to said top cutting and lifting device, a beet receptacle in said frame adapted to receive the beets from said beet lifting device, a top receptacle behind said beet receptacle in said frame and adapted to receive the tops from said top cutting and lifting device, a mechanism for opening and closing said beet receptacle, another mechanism for opening and closing said top receptacle, and adjustable means on one of said wheels for operating said two mechanisms at predetermined points of time.

2. In a beet-harvester, the combination with a frame, of wheels for supporting said frame and adapted to roll on the soil, a receptacle in said frame, a mechanism for opening and closing said receptacle, a toothed concentric ring fastened on one of said wheels and provided with a groove along the periphery, a strap movable in the groove of said toothed ring and provided with an arm, and a spring-pressed lock longitudinally guided in the arm of said strap and adapted to engage in any tooth space of said ring, the arm of said strap being adapted to operate said mechanism.

JACOB BÖCKER.

Witnesses:
 Louis Vandory,
 J. Thranberend.

---

Copies of this patent may be obtained for five cents each, by addressing the "Commissioner of Patents, Washington, D. C."